Feb. 28, 1939.　　　T. WALLACE　　　2,148,663
TIRE VULCANIZER
Filed June 21, 1935　　2 Sheets-Sheet 1

INVENTOR.
Townley Wallace
By Glenn S. Noble ATTORNEY.

Feb. 28, 1939.  T. WALLACE  2,148,663
TIRE VULCANIZER
Filed June 21, 1935  2 Sheets-Sheet 2
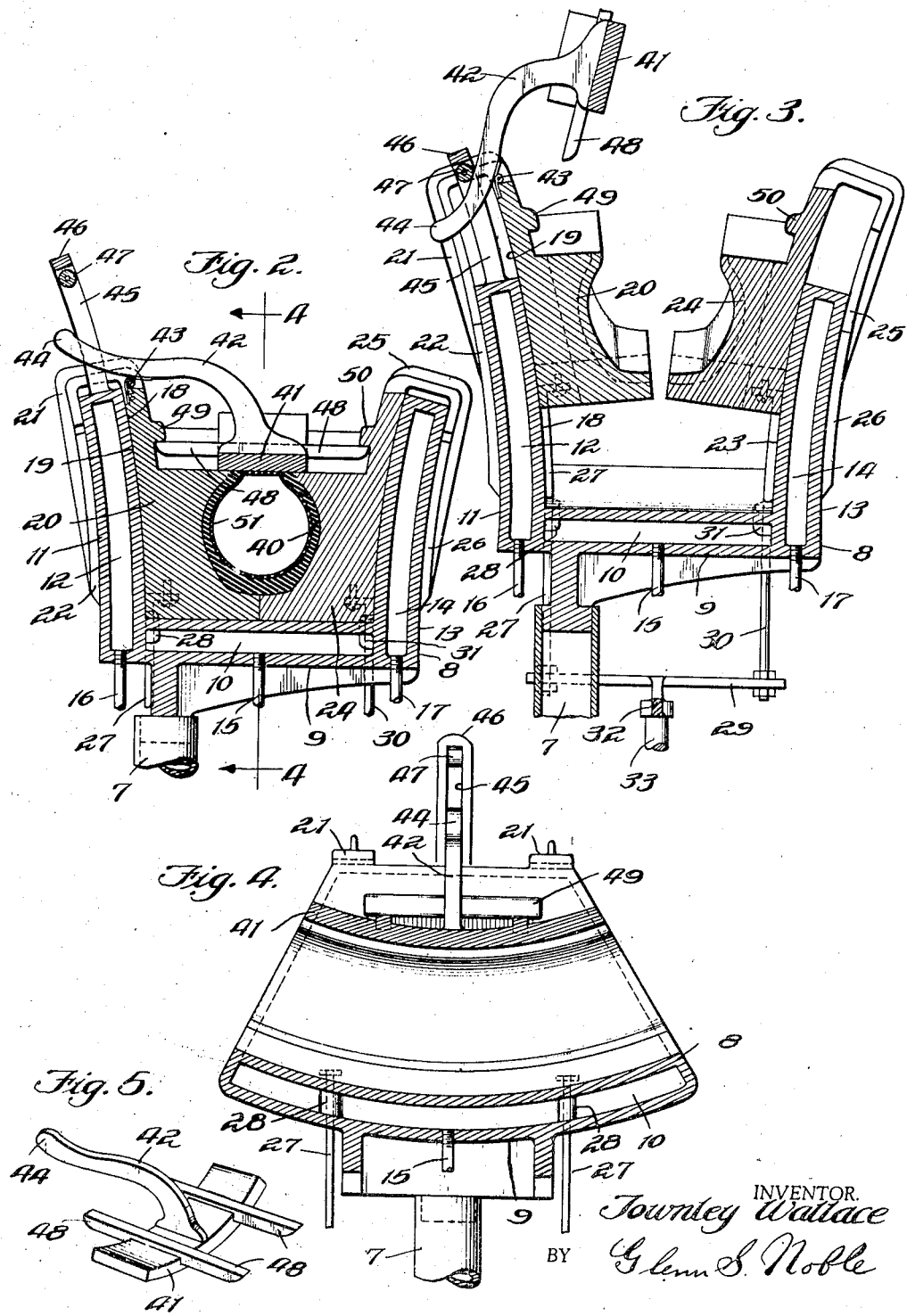
INVENTOR.
Townley Wallace
BY Glenn S. Noble
ATTORNEY.

Patented Feb. 28, 1939

2,148,663

UNITED STATES PATENT OFFICE 2,148,663

TIRE VULCANIZER

Townley Wallace, Chicago, Ill., assignor to Lillie Wallace, Chicago, Ill.

Application June 21, 1935, Serial No. 27,667

7 Claims. (Cl. 18—18)

This invention relates particularly to machines or apparatus for vulcanizing tires and is particularly intended for use in repairing or patching worn or defective casings.

With vulcanizers of this type heretofore used it has been common to utilize adjustable bead plates and to provide means for adjusting the sides of the mold members or heat chambers for different sized matrix, the adjustment being dependent upon the skill of the operator. With such adjustable members, and particularly the adjustable bead plates, the tire is apt to become pinched or marked, or else sufficient pressure may not be applied so that when the repair is completed the repaired section will not only be noticeable on account of not conforming to the remainder of the tire, but will make the tire defective on account of forming a hump or depression therein, or throwing it out of balance so that the tire will not be satisfactory in use. Furthermore the molds of such vulcanizers as heretofore used have been commonly arranged so that the operator must open the same by hand and frequently the tire will stick so that it is difficult to remove the same, and the operation will require an undue amount of time.

In accordance with the present invention I provide a vulcanizer having a non-adjustable bead plate so that the operator cannot actuate the same in such a manner as to injure the tire; and also provide an improved apparatus of this kind which will avoid the difficulties set forth above.

The objects of this invention are to provide an improved vulcanizer for tires which will be simple in construction and which may be operated by suitable power to open and close the same; to provide a vulcanizer for patching tires or casings in which the mold sections may be raised and will simultaneously spread apart for opening the same to release the tire, and conversely will draw together automatically when the die is placed in position therein for vulcanizing; to provide a tire vulcanizer having heated mold sections which may be quickly opened and closed by means of suitable power instead of being manually operated; to provide a tire vulcanizer which is adapted for various sized tires; and to provide such other advantages and improvements as will appear more fully from the following description.

In the accompanying drawings illustrating this invention,

Figure 2 is a sectional detail taken on the line 2—2 of Figure 1, showing the parts in closed or vulcanizing position;

Figure 3 is a view similar to Figure 2 showing the mold in open position; and

Figure 4 is a sectional view taken on the line 4—4 of Figure 2.

Figure 1:
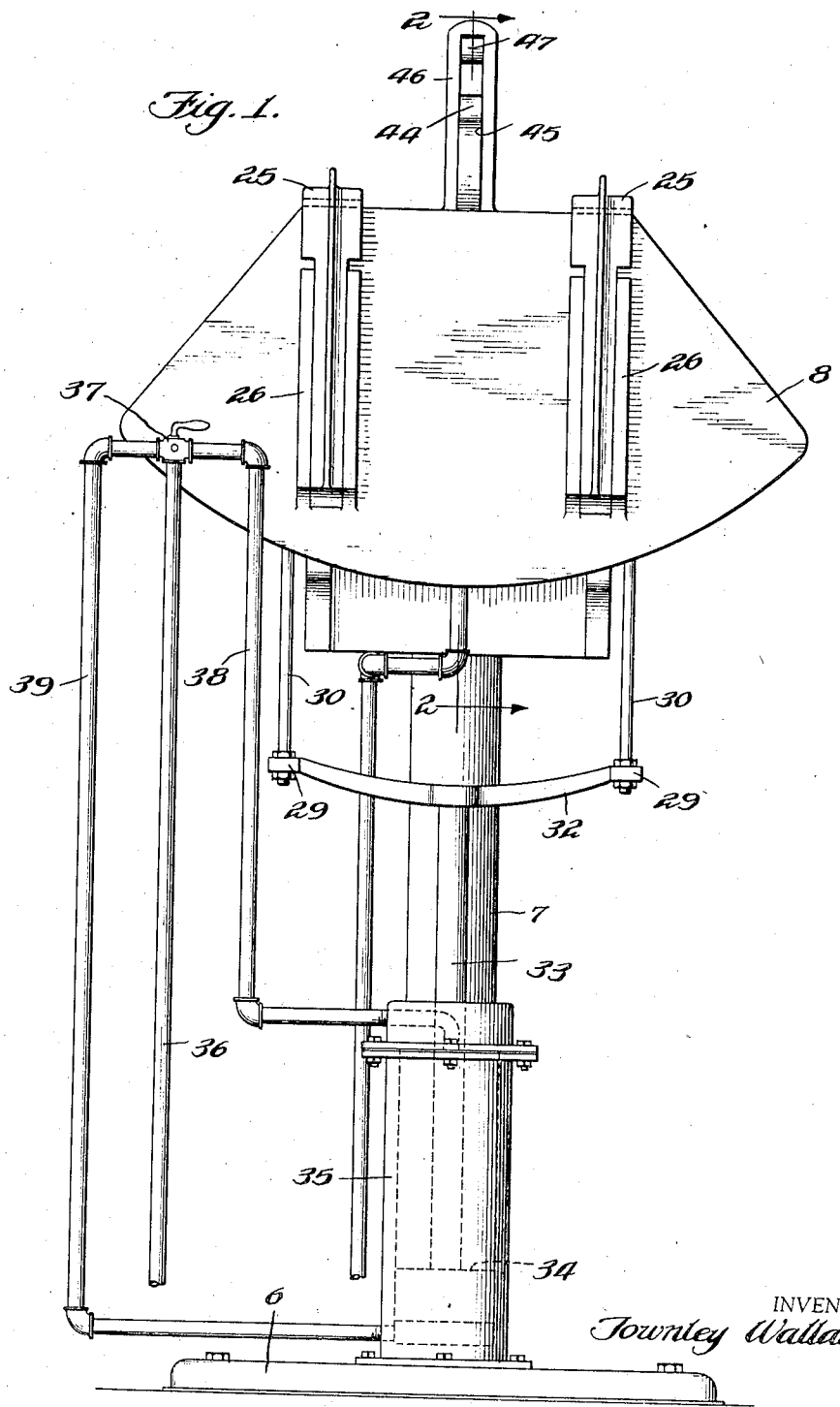
Figure 1 is a front view of my improved vulcanizer.

While my improved vulcanizer may be mounted in any desired manner, as shown in these drawings it is mounted on a base 6 having a post or upright 7 which carries the mold or main body portion 8. The body 8 comprises a bottom portion 9 which is hollowed out to provide a transverse steam chamber 10; and also a rear upwardly extending portion 11 which is hollowed out to provide a steam chamber 12; and an upwardly extending front portion 13 which is hollowed out to provide a front steam chamber 14. These parts are preferably cast integrally and supply pipes 15, 16 and 17 are provided for supplying steam or other suitable heating medium to the respective chambers from any convenient source of supply. The back and front body portions 11 and 13 diverge upwardly and serve as guides and supports for the die or mold members. The front face 18 of the back portion 11 is preferably finished for engagement with the correspondingly curved and finished rear surface 19 of one of the side die or mold members 20 which is adapted to slide up and down thereon. The mold section 20 is provided with guide and supporting arms 21 which extend down over the back 11 and engage with the curved back surface thereof as shown particularly in Figures 2 and 3. The guide arms 21 engage with ribs or guideways 22 which prevent lateral movement of the same.

The inner surface 23 of the front portion 13 of the body is also preferably curved and finished for engagement with a complementary die or mold member 24 which coacts with the mold member 20.

The mold member 24 is also provided with arms 25 which extend down over the front of the steam chamber and engage with guideways 26 as shown in Figure 1.

The mold members 20 and 24 may be actuated in any suitable manner but preferably by means of power operating means such as an air or hydraulic cylinder. As an illustration of such means, the mold member 20 is provided with operating rods 27 which extend downwardly through bearings 28 in the body and engage with the rear ends of bars 29 arranged below the body as shown in Figure 1. The front mold member 24 is likewise provided with operating rods 30 which extend downwardly through bearings 31 and engage with the front ends of the bars 29. The bars 29 are connected by a yoke or cross member 32 which is mounted on the upper end of a piston rod 33 which is actuated by a piston 34 in an operating cylinder 35 of the type commonly used for such operations. The cylinder is supplied with air or other suitable operating fluid through an inlet or supply pipe 36 from any source of supply (not shown) which leads to a two-way or controlling valve 37 which is preferably arranged adjacent to the body of the vulcanizer so that the operator may actuate the same without stooping or leaving the machine. One branch pipe 38 leads from the valve 37 to the top of the cylinder and another branch pipe 39 leads from the valve to the bottom of the cylinder, the arrangement being such that the operating fluid may be supplied to either end of the cylinder to force the piston up or down for actuating the mold members as will presently be explained.

The mold cavity for receiving the tire 40 is completed by means of a top mold member 41 such as commonly known as a bead plate, which member is curved longitudinally as shown in Figure 4, to conform to the curvature of the tire and also to conform to the longitudinal curvature of the mold members 20 and 24. This bead plate is preferably carried on an arm or lever 42 which is hinged at 43 to an upwardly extending portion of the mold member 20 and which has a rearwardly extending curved portion 44 which projects through a slot 45 in a bracket 46 which extends upwardly from the rear body of the member 11. A roller stop or detent 47 is mounted in the slot 45 for engagement with the arm 44 when the mold member 20 is raised to a predetermined position as shown in Figure 3. The bead plate 41 has transversely arranged bars or projections 48, the ends of which are adapted to be engaged by lugs or projections 49 and 50 on the respective mold members 20 and 24 for holding the bead plate in closed position.

In the operation of the device the tire is inserted with the mold open as shown in Figure 3, with the section to be repaired or retreaded placed between the mold members or movable side pieces 20 and 24. It will be understood that the inner surfaces of these mold members are shaped and engraved or embossed to conform to the particular tire which is being repaired, thus serving as matrices in the vulcanizing operation. Air or pressure fluid is then admitted above the piston and the piston and coacting parts are forced downwardly, thus causing the mold members 20 and 24 to gradually close in on the tire and to press the same against the inner pressure bag 51 which is inserted in the tire in the usual manner. As the mold members move downwardly they also approach each other so that the closing action is in the nature of a radial movement and the tire will finally be held in fixed position in the vulcanizer when the mold members reach their closing position. During this movement the top plate or bead plate 41 is permitted to swing downwardly by gravity until at the final closing movement the projections or lugs 49 ride over the ends of the bars 48 and hold the bead plate rigidly in fixed position against the tops of the mold members. Steam may then be admitted to one or more of the steam chambers through their inlet pipes, depending upon the position of the patch, or nature of the repair, and the vulcanizing will then proceed for the proper length of time.

When the tire is to be removed the valve 37 is turned to release the air from the top of the cylinder and to admit air into the bottom of the cylinder, thereby forcing the piston and coacting parts upwardly. During this movement the diverging travel of the mold members 20 and 24 causes the contacting surfaces to be gradually rolled off or pulled away from the tire so that there is little possibility of the tire sticking therein. As these parts reach the upward limit of travel the arm 44 engages with the roller 47 and swings the bead plate 41 up to raised position, the upward travel having in the meantime freed the same from the lugs 49 and 50, thus leaving a free passageway for the removal of the tire.

In the particular arrangement shown the mold members 20 and 24 are made integral with their guide members 21 and 25 and these entire parts are preferably changed for different sized or different makes of tires. However, it will be noted that, if desired, face plates or other arrangements may be made to be changed instead of changing these entire pieces. It will also be noted that instead of having the body provided with front and back curved members, these might be made straight to give the diverging action for the mold pieces but the curved arrangement is preferable in order to more quickly separate the molds for a given distance of upward travel.

From this description it will be seen that I provide a tire vulcanizer in which substantially all of the operation is done by mechanical or power means as distinguished from manual operation, and as the tire cavity formed by the side pieces and bead plate is of fixed shape there is no possibility of the tire being pinched or improperly arranged in the mold through the action of the operator. The position of the open mold is also such that the operator can readily withdraw the tire therefrom and insert another tire with but little labor so that the operations may be rapidly performed. It will also be noted that changes other than those suggested may be made in order to adapt the vulcanizers for different forms of tires, or for other reasons, without departing from the scope of this invention and therefore I do not wish to be limited to the particular arrangement shown and described except as specified in the following claims, in which I claim:

1. A tire vulcanizer including a body, means for supplying heat to said body, curved diverging guideways formed by said body, a pair of mold members coacting with said guideways, each having a mold cavity conforming to the surface of one side of the tire to be acted upon, said mold members being closed when in lowered position and opened when in raised position, power means for reciprocating said members, a curved bead plate having a straight face coacting with said members to define a tire chamber of fixed cross section, and means for fastening the bead plate in fixed position with relation to the mold members when in closed position.

2. In a tire vulcanizer, the combination of a body having a curved bottom portion with a chamber therein and having upwardly extending, outwardly curved front and back portions with chambers therein, means for supplying a heating fluid to said chambers, a pair of mold members slidably mounted on said front and back portions, arms connected with said mold members and coacting with the front and back members to guide the mold members, an operating cylinder and piston, means connecting the piston with said mold members for reciprocating the same, an arm pivotally mounted on one of said mold members, a bead plate carried by said arm, means on said mold members coacting with the bead plate to hold the same in closed position, and a detent carried by said body and engaging with one end of the arm for swinging the bead plate upwardly when the mold is opened.

3. In an apparatus for vulcanizing tires, the combination of a support, a body mounted on said support and having a chamber therein for receiving a heating fluid, said body having a bottom portion and upwardly extending diverging front and back portions, movable side pieces slidably mounted on the front and back portions and having recesses for receiving a tire to be vulcanized, arms connected with said movable side pieces and extending over the front and back body portions, guideways on said portions engaged by said arms, a cylinder mounted below the body and having an operating piston, a piston rod connected with said piston, a cross head on said piston rod, rods connecting said cross head with said side pieces for raising and lowering the same, a bead plate engaging with the side pieces when in closed position to form a mold cavity for the tire, means coacting with the side pieces for holding the plate in closed position, an arm connected with said plate and pivotally mounted on one of said side pieces, and a stop carried by the body portion which is engaged by the arm when the side pieces move upwardly, thereby causing the bead plate to be raised to open position.

4. An apparatus of the character set forth, comprising a base, a post extending upwardly from said base, a tire mold mounted on said post, a split matrix mounted in said mold, upwardly and outwardly extending curved guides for said matrix, power actuated means for raising and lowering said matrix, a closure piece coacting with the matrix to define a mold cavity for the tire and means for automatically lifting said closure piece when the matrix is moved to open position.

5. In a tire vulcanizer, the combination of a support, a body mounted on said support having steam chambers therein, said body having upwardly and outwardly curved front and back portions, contour plates slidably mounted on said front and back portions and guided thereby to cause them to move from open to closed position as they are moved downwardly, a top plate coacting with said contour plates to form a mold chamber, means for reciprocating said contour plates to move them from open to closed position and also from closed to open position, and means for automatically opening the top plate when the contour plates are moved to open position.

6. An apparatus for vulcanizing tires comprising a tire mold, a split matrix mounted in said mold having cavities conforming to the tire to be acted upon, upwardly and outwardly extending curved guides for said matrix, power means for raising and lowering the matrix with respect to the mold, a closure piece coacting with the matrix to define the mold cavity for the tire, and means for lifting said closure piece when the matrix is moved to open position.

7. An apparatus for vulcanizing tires comprising a body portion having upwardly and outwardly extending guides, a split matrix mounted in said body portion and engaging with said guides, having cavities conforming to the tire to be acted upon, means connected with the bottom portions of the matrix members for raising and lowering the matrix to open and close the same, a bead plate fitting the top of the matrix to define the mold cavity for the tire, means for lifting said bead plate when the matrix is moved to open position and to lower said plate when the matrix is moved to closed position, and means for locking the bead plate in closed position.

TOWNLEY WALLACE.